Patented Oct. 23, 1951

2,572,710

UNITED STATES PATENT OFFICE 2,572,710

PREPARATION OF TEREPHTHALIC ACID

William S. Emerson and Theodore C. Shafer, Dayton, Ohio, assignors to Monsanto Chemical Company, St. Louis, Mo., a corporation of Delaware No Drawing. Application September 23, 1949, Serial No. 117,495

6 Claims. (Cl. 260—525)

This invention relates to a method of preparing pure terephthalic acid from impure mixtures as obtained by the oxidation of para-xylene. More specifically the invention relates to a method of separating terephthalic acid from para-toluic acid, the principal impurity in oxidized para-xylene mixtures.

Terephthalic acid and para-toluic acid are exceedingly difficult to separate because of their similarity with respect to chemical and physical properties. Their high boiling points and slight solubility make physical separations difficult. Chemical methods of separation have not been effective, principally for economic reasons.

The primary purpose of this invention is to provide a method of preparing pure terephthalic acid. A further purpose of this invention is to provide a method for separating terephthalic acid from para-toluic acid. A still further purpose of this invention is to provide a means of separating the oxidation products of para-xylene.

It has now been found that substantially complete separations of terephthalic acid and para-toluic acid may be effected by washing with para-xylene at temperatures in excess of 120° C. Preferred practice involves the use of para-xylene at temperatures between 140° C. and 200° C., at pressures necessary to maintain the para-xylene in liquid form. The separation can be accomplished by stirring the impure acid with para-xylene in a closed retort, heating to the desired temperature and filtering the resulting mixture while maintaining the temperature within the critical range. The effectiveness of the separation will depend upon the quantity of para-xylene mixed with the impure terephthalic acid. Optimum practice involves the washing of the filter cake with one or more portions of the para-xylene at the critical temperature, and reprecipitating the terephthalic acid by dissolution in caustic and neutralizing the solution. In this manner substantially complete separations of terephthalic and para-toluic acids may be accomplished.

Further details of the practice of this invention are set forth with respect to the following examples.

Example 1

An autoclave was charged with 100 grams of an impure terephthalic acid containing 7.4 percent of para-toluic acid and 2000 cc. of para-xylene. The mixture was stirred for one half hour at 125 to 130° C. at 100 pounds per square inch pressure. The mixture was forced through a filter into a pressurized receiver, the pressure differential being 15 to 20 pounds per square inch. Upon reprecipitation after dissolution in caustic soda no traces of para-toluic acid were found.

Example 2

The procedure of the preceding experiment was duplicated using a temperature of 175° C. and a terephthalic acid containing 6.7 percent of para-toluic acid. Upon reprecipitation of the filter cake no evidence of para-toluic acid content was found.

Example 3

To demonstrate the unusual effect of pressure filtration and the critical nature of the temperature a Sohxlet extraction was performed on 30 grams of an impure terephthalic acid containing 5.7 percent of para-toluic acid. The temperature of the solvent in the extractor was approximately 100° C. After six hours of extraction 29.5 grams of residue remained, having a composition substantially that of the original charge.

The invention is defined by the following claims.

We claim:

1. A method of separating a mixture of terephthalic acid and para-toluic acid, which comprises contacting the mixed acids with para-xylene at a temperature in excess of 120° C., and filtering the resulting slurry at a temperature in excess of 120° C.

2. A method of separating a mixture of terephthalic acid and para-toluic acid, which comprises contacting the mixed acids with para-xylene at a temperature between 140° C. and 200° C., and filtering the resulting slurry at a temperature between 140° C. and 200° C.

3. A method of removing para-toluic acid from impure terephthalic acid, which comprises contacting the impure terephthalic acid with para-xylene at superatmospheric pressure at a temperature above 120° C., and filtering the resulting slurry under superatmospheric pressure at a temperature in excess of 120° C.

4. A method of removing para-toluic acid from impure terephthalic acid, which comprises contacting the impure terephthalic acid with para-xylene at superatmospheric pressure at a temperature between 140° C. and 200° C., and filtering the resulting slurry under superatmospheric pressure at a temperature between 140° C. and 200° C.

5. A method of removing para-toluic acid from impure terephthalic acid, which comprises contacting the impure terephthalic acid with paraxylene at superatmospheric pressure at a temperature above 120° C., filtering the resulting slurry under superatmospheric pressure at a temperature in excess of 120° C., and reprecipitating the terephthalic acid from caustic solution.

6. A method of removing para-toluic acid from impure terephthalic acid, which comprises contacting the impure terephthalic acid with paraxylene at superatmospheric pressure at a temperature between 140° C. and 200° C., filtering the resulting slurry under superatmospheric pressure at a temperature between 140° C. and 200° C., and reprecipitating the terephthalic acid from caustic solution.

WILLIAM S. EMERSON.
THEODORE C. SHAFER.

REFERENCES CITED

The following references are of record in the file of this patent:

UNITED STATES PATENTS

| Number | Name | Date |
|---|---|---|
| 1,919,023 | Jaeger | July 18, 1933 |
| 2,245,528 | Loder | June 10, 1941 |
| 2,479,067 | Gresham | Aug. 16, 1949 |

FOREIGN PATENTS

| Number | Country | Date |
|---|---|---|
| 364,442 | Germany | Nov. 25, 1922 |

OTHER REFERENCES

Heilbron: Dict. of Org. Compounds (Oxford), pages 664, 777 (1938).